(12) United States Patent
Kameda et al.

(10) Patent No.: US 6,631,341 B2
(45) Date of Patent: Oct. 7, 2003

(54) SIGNAL ANALYZING APPARATUS

(75) Inventors: Keiji Kameda, Atsugi (JP); Toshiyuki Matsuda, Koriyama (JP); Yuichiro Hashimoto, Fukushima-ken (JP)

(73) Assignee: Anritsu Corporation, Tokyo (JP)

( * ) Notice: Subject to any disclaimer, the term of this patent is extended or adjusted under 35 U.S.C. 154(b) by 209 days.

(21) Appl. No.: 09/789,235

(22) Filed: Feb. 20, 2001

(65) Prior Publication Data
US 2002/0016691 A1 Feb. 7, 2002

(30) Foreign Application Priority Data

Feb. 24, 2000 (JP) .................................... 2000-047888

(51) Int. Cl.$^7$ ............................................. G06F 19/00
(52) U.S. Cl. ...................... 702/124; 324/76.27; 341/61
(58) Field of Search .............................. 702/66, 67, 68, 702/69, 70, 71, 73, 74, 75, 76, 77, 124, 126, 183, 189, 190, 193, 197; 324/76.27, 76.19, 76.23, 76.24, 76.26; 341/61, 122, 123; 708/313, 316, 300

(56) References Cited

U.S. PATENT DOCUMENTS 5,126,737 A * 6/1992 Torii ........................ 341/61
5,272,656 A * 12/1993 Genereux ................. 708/322
5,696,847 A * 12/1997 Trew ........................ 382/254
6,057,791 A * 5/2000 Knapp ..................... 341/122
6,275,020 B1 * 8/2001 Nagano ................... 324/76.27
6,275,836 B1 * 8/2001 Lu ........................... 708/313

* cited by examiner

Primary Examiner—Marc S. Hoff
Assistant Examiner—Mohamed Charioui
(74) Attorney, Agent, or Firm—Frishauf, Holtz, Goodman & Chick, P.C.

(57) ABSTRACT

In an RBW filter, a bandwidth is set so as to selectively pass a frequency component of only a desired signal bandwidth of the measured signals that have been frequency converted into a normalized intermediate frequency signal. A waveform detector detects a signal that passes through the RBW filter. An A/D converter samples the signal detected by the waveform detector at a predetermined sampling rate at which a Nyquist frequency is within the frequency bandwidth of the RBW filter, thereby converting the sampled signal into digital data. A data storage section stores the digital data converted by the A/D converter. A signal processing section re-samples the digital data stored in the data storage section so as to reproduce a bandwidth of the detection signal of the waveform detector, thereby generating arbitrary time data. A display section displays the arbitrary time data generated by the signal processing section while time and amplitude are defined on horizontal and vertical directions on the display screen.

9 Claims, 5 Drawing Sheets

SIGNAL ANALYZING APPARATUS

CROSS-REFERENCE TO RELATED APPLICATIONS

This application is based upon and claims the benefit of priority from the prior Japanese Patent Application No. 2000-47888, filed Feb. 24, 2000, the entire contents of which are incorporated herein by reference.

BACKGROUND OF THE INVENTION

The present invention relates to a signal analyzing apparatus for measuring frequency characteristics of a signal employed for a mobile communication system such as automobile telephone or portable telephone, and displaying a waveform of the signal, thereby analyzing the signal.

A signal employed for a mobile communication system such as automobile telephone or portable telephone, for example, is modulated by a variety of systems.

In addition, a TDMA (Time Division Multiple Access) system is employed as a communication system in order to efficiently use a communication line.

A frequency of a carrier wave for carrying a signal employed in such a mobile communication system ranges some hundreds MHz to some GHz, which is very high.

In general, a signal analyzing apparatus such as spectrum analyzer is employed for precisely measuring a variety of frequency components included in such a signal.

FIG. 3 is a block diagram depicting a general configuration of a conventional signal analyzing apparatus used for measuring frequency characteristics of a measured signal with its high frequency.

In a signal analyzing apparatus 21 shown in FIG. 3, a measured signal with its high frequency inputted via an input terminal 22 is adjusted to a predetermined, normalized level by an attenuator (ATT) (not shown).

Then, the level adjusted, measured signal with its high frequency is mixed with a local oscillation signal from a local oscillator 24 by means of a signal mixer 23, and the mixed signal is converted into an intermediate frequency signal having its intermediate frequency.

Here, the oscillation frequency of the local oscillator can be swept (frequency swept) over the range of predetermined frequencies by means of a sweep control section (not shown).

In this manner, a frequency of the intermediate frequency signal outputted from the signal mixer 23 also changes in synchronization with a sweep operation.

Then, the intermediate frequency signal with its reduced frequency is inputted to a resolution bandwidth (hereinafter, referred to as RBW) filter 25, an undesired frequency component is eliminated by means of the RBW filter 25, and only a required intermediate frequency signal is selected.

A bandwidth (RBW) at a time when a peak level at the passage center frequency of the frequency characteristics of this RBW filter 25 drops by 3 dB indicates a frequency resolution in this signal analyzing apparatus.

A signal from the RBW filter 25 is gain adjusted by means of an amplifier (not shown), and a switching section 26 is switched to a LOG converter 27 side. In this state, a signal logarithm converted by means of a LOG converter 27 to be compressed is detected by means of a waveform detector (DET) 28.

In contrast, when the switching section 26 is switched to the RBW filter 25 side, the signal from the RBW filter 25 is detected by means of a waveform detector (DET) 28.

The signal detected by this waveform detector 28 within a sweeping period indicates the size of a time series waveform at the swept frequency.

The thus outputted signal by the waveform detector 28 is inputted to an anti-aliasing filter 29.

The anti-aliasing filter 29 used here is composed of a filter for eliminating a high frequency component (noise component) of a frequency spectrum waveform finally displayed at a display section 34 provided at a panel of an apparatus main body.

The signal from this anti-aliasing filter 29 is converted into digital data by means of a next A/D converter 30, and the converted digital data is stored in a data storage section 31.

Predetermined processing is applied to the digital data stored in this data storage section 31 by means of a signal processing section 33.

Then, the frequency spectrum waveform obtained by this processing is displayed in a frequency domain (frequency on horizontal axis and amplitude on vertical axis) on a display screen of the display section 34.

In the meantime, in the signal analyzing apparatus 21 of such type, a signal employed in a mobile communication system such as automobile telephone or portable telephone, the signal being inputted as a measured signal is a burst shaped signal whose level changes with an elapse of time.

In the field of such mobile communication system, there is a demand to measure such burst shaped signal in detail by tracking a time.

The signal analyzing apparatus 21 shown in FIG. 3 is provided with a function for performing time span sweeping such that a frequency of the local oscillator 24 is fixed so as to measure a time change of a signal bandwidth-restricted by the RBW filter 25 within a normalized bandwidth, thereby displaying the result of the time span sweeping while time and amplitude are defined on the horizontal and vertical axes, respectively, on the display screen of the display section 34.

By this time span sweeping, in the case where a burst shaped measured signal is measured in detail by tacking a time, there have been conventionally employed a method of measuring the signal by changing a sampling rate of an A/D converter and a method of decimating unwanted data after sampling has been performed at a sufficiently high speed by employing an A/D converter that operates at a high speed.

However, in the method of changing the sampling rate of the A/D converter, it has been necessary to reacquire data every time the sampling rate is changed.

Moreover, in the case where the sampling rate is changed, thereby causing operation at a high speed, there has been a problem that a sufficient dynamic range cannot be obtained.

In the method of decimating unwanted data after sampling has been performed at a sufficiently high speed by using the A/D converter that operates at a high speed, it has been necessary to use a sampling rate of the lowest common multiple for the resolution of data per one time domain to be acquired.

For example, in the case where 1 $\mu$sec is required as a time span, assuming that 500 items of data are provided, a resolution of 2 nsec per one item of data is obtained. Thus, the sampling rate of the A/D converter is set to a frequency of 500 MHz.

Similarly, the sampling rate of the A/D converter at a resolution of 5 nsec is set to a frequency of 200 MHz.

In order to meet resolutions of both of the above 2 nsec and 5 nsec, it is required that the A/D converter operates when the sampling rate of the converter is set to a frequency of 1 GHz.

Therefore, with the above described method, the sampling rate of the A/D converter could not be changed freely.

Even if the sampling rate can be changed, in the case of a high speed operation, there has been a problem that a sufficient dynamic range cannot be obtained.

In addition, there has been a problem that a memory requires its capacity corresponding to the maximum operation.

Namely, in the case where the sampling rate is changed, thereby causing high speed operation, it is required to use an A/D converter that corresponds to the highest speed operation. In the A/D converter that corresponds to high speed operation, there has been a problem that a sufficient conversion bit cannot be allocated, processing must be done at the same conversion bit even during a low speed sampling, and there is a limitation to a dynamic range according to the conversion bit, thus making it impossible to obtain a sufficient dynamic range.

In the meantime, in the signal analyzing apparatus 21 shown in FIG. 3, a signal bandwidth-limited by the RBW filter 25, the signal passing through the waveform detector 28, is a base band signal having a bandwidth of the RBW filter 25.

The inventors found that the bandwidth of the RBW filter 25 is sampling at a sampling rate that can be reproduced, and then, arbitrary time data is generated by means of re-sampling using a digital signal processing technique, whereby detailed time analysis can be performed without changing the sampling rate, and reached the present invention based on the findings.

BRIEF SUMMARY OF THE INVENTION

The present invention has been made in order to solve the foregoing problems. It is an object of the present invention to provide a signal analyzing apparatus capable of performing detailed time analysis by reproducing arbitrary time data without increasing a sampling rate of an A/D converter, and capable of obtaining a sufficient dynamic range.

In order to achieve the foregoing object, according to a first aspect of the present invention, there is provided a signal analyzing apparatus comprising:

- a resolution bandwidth (hereinafter, referred to as RBW) filter 5 in which a bandwidth is set so as to selectively pass a frequency component of only a desired signal bandwidth, of the measured signal frequency-converted into a normalized intermediate frequency signal;
- a waveform detector 8 for detecting a signal passing through the RBW filter;
- an analog/digital (hereinafter, referred to as A/D) converter 10 for sampling the signal detected by the waveform detector at a predetermined sampling rate at which a Nyquist frequency is within the frequency bandwidth of the RBW filter, thereby converting the sampled signal into digital data;
- a data storage section 11 for storing digital data converted by the A/D converter;
- a signal processing section 13 for re-sampling the digital data stored in the data storage section so as to enable to reproduce a bandwidth of the signal detected by the waveform detector, thereby generating arbitrary time data; and
- a display section 34 for displaying the arbitrary time data generated by the signal processing section while time and amplitude are defined on horizontal and vertical axes, respectively, on a display screen.

In addition, in order to achieve the foregoing object, according to a second aspect of the present invention, there is provided a signal analyzing apparatus according to the first aspect, wherein re-sampling at the signal processing section is performed by using at least one of line interpolation, spline function interpolation and sampling function interpolation.

Further, in order to achieve the foregoing object, according to a third aspect of the present invention, there is provided a signal analyzing apparatus according to the second aspect, wherein re-sampling at the signal processing section is performed by using the sampling function interpolation, and a passing bandwidth of the sampling function interpolation is limited by a window function.

Furthermore, in order to achieve the foregoing object, according to a fourth aspect of the present invention, there is provided a signal analyzing apparatus according to the first aspect, wherein an anti-aliasing filter 9 set in a passing bandwidth encompassing the maximum bandwidth of the RBW filter is provided between the RBW filter and the A/D converter.

Still furthermore, in order to achieve the foregoing object, according to a fifth aspect of the present invention, there is provided a signal analyzing apparatus according to the first aspect, wherein the signal processing section comprises:

- data acquisition management means for, in interpolating data between the existing data, guaranteeing acquisition of interpolation data before and after generation data used for interpolation, and then, associating a data acquisition timing from the data storage section with an address of the data storage section;
- processing condition converting means for determining a condition corresponding to a data generation resolution (time span) indicating how many address in the data storage section is required for one item of data, and determining a condition corresponding to a data acquisition timing indicating what is the number of data generated in the data storage section or indicating the number of address from which the data in the data storage section must be used;
- data generating means for using a re-sampling function (or interpolation function and decimation), thereby generating data between the existing sampling data stored in the data storage section by means of re-sampling; and
- display control means for controlling a display section so as to display a level variation of the measured signal based on data generated by the data generating means based on the data stored in the data storage section while time and amplitude are defined on horizontal and vertical axes, respectively, on the display screen of the display section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed descrip

DETAILED DESCRIPTION OF THE INVENTION

Figure 1A:
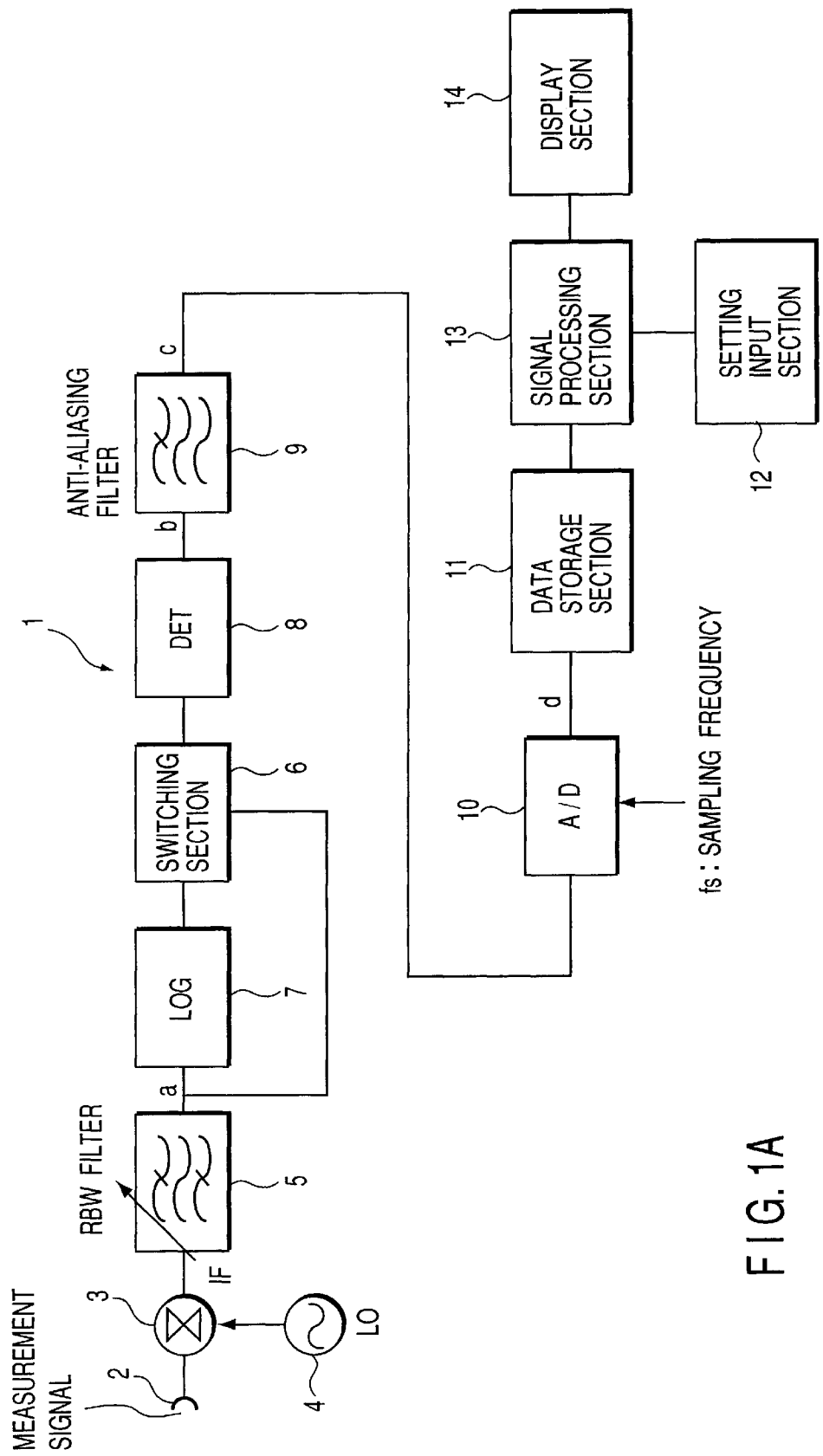
- FIG. 1A is a block diagram depicting a general configuration of a signal analyzing apparatus according to one embodiment of the present invention.

Reference will now be made in detail to the presently preferred embodiments of the invention as illustrated in the accompanying drawings, in which like reference numerals designate like or corresponding parts.

Hereinafter, a signal analyzing apparatus according to one embodiment of the present invention will be described with reference to the accompanying drawings.

FIG. 1A is a schematic block diagram depicting a signal analyzing apparatus 1 according to one embodiment of the present invention.

Figure 1B:
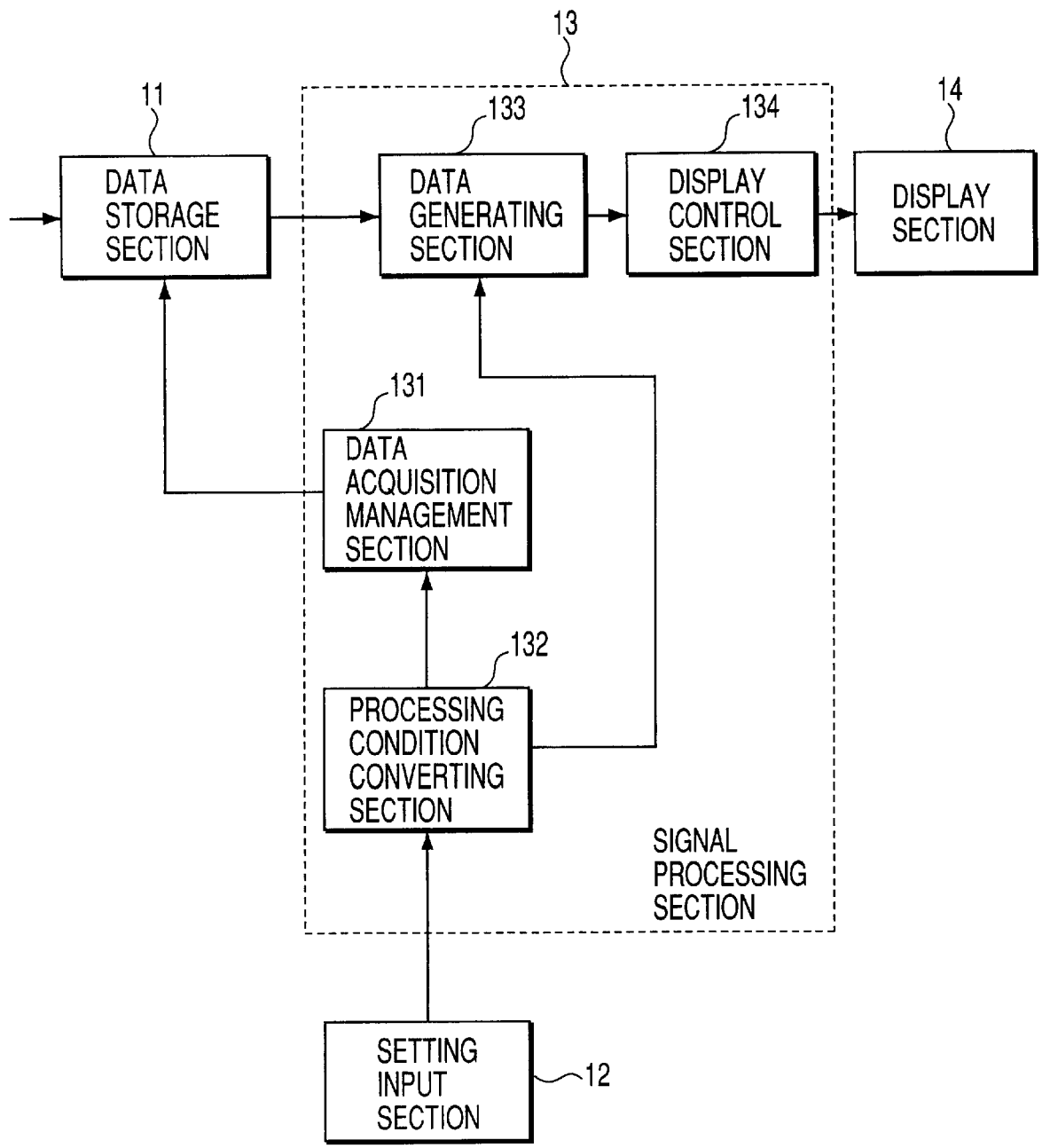
FIG. 1B is a functional block diagram depicting an internal configuration of a signal processing section shown in FIG. 1A.

FIG. 1B is a functional block diagram depicting an internal configuration of a signal processing section shown in FIG. 1A.

Figure 1C:
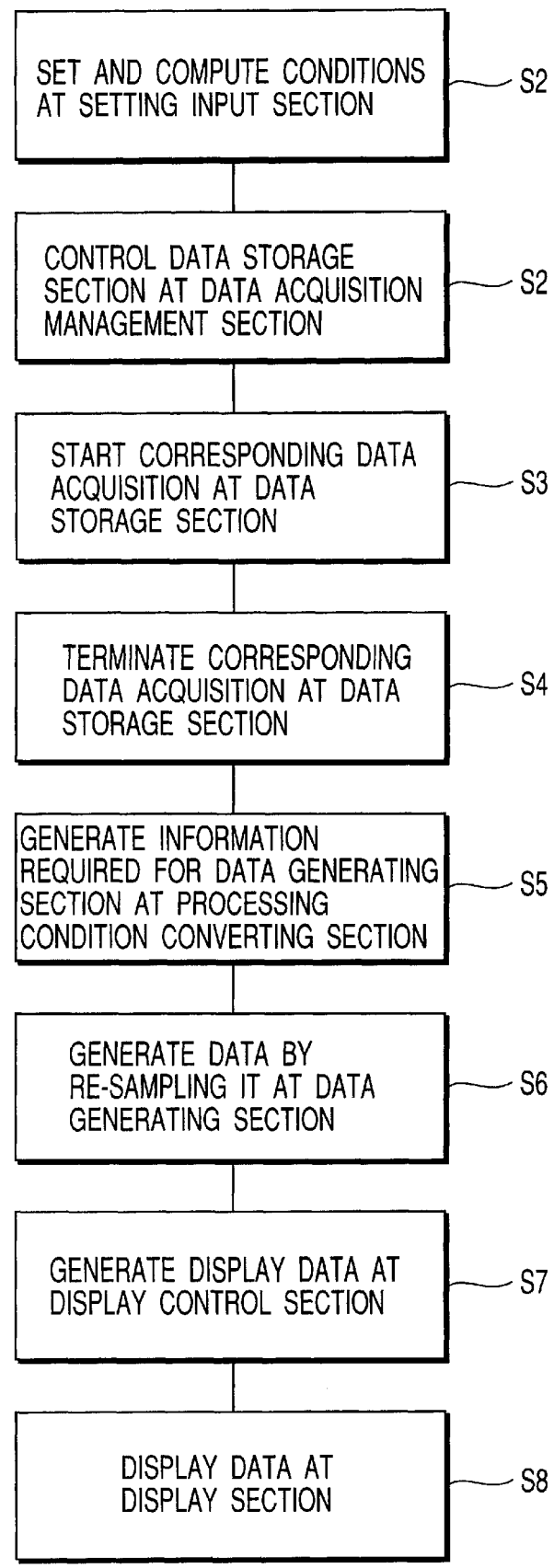
FIG. 1C is a flow chart illustrating an operation of each portion of the signal processing section shown in FIG. 1B.

FIG. 1C is a flow chart illustrating an operation of each portion of the signal processing section shown in FIG. 1B.

Figure 1D:
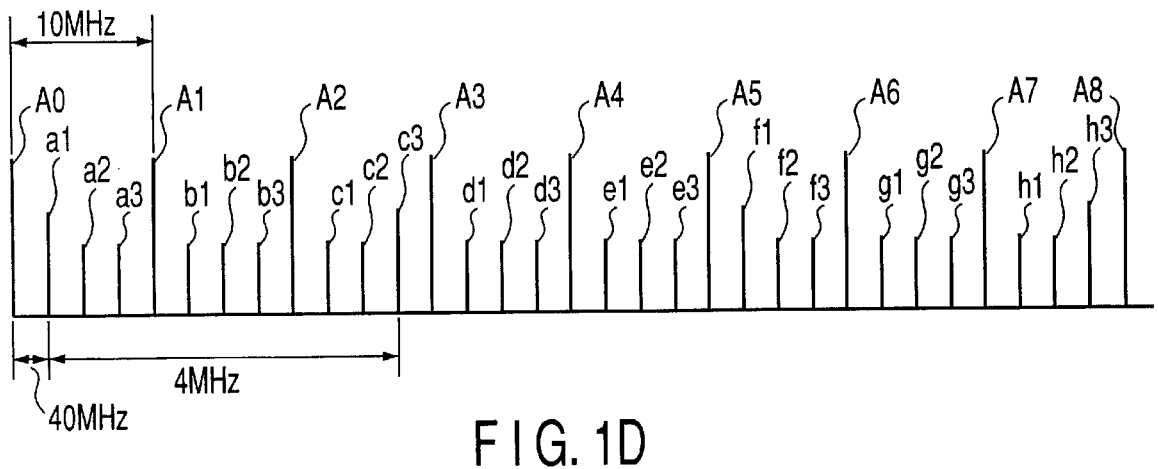
FIG. 1D is a view illustrating a re-sampling operation caused by the signal processing section shown in FIG. 1B.

FIG. 1D is a timing waveform chart illustrating a re-sampling operation caused by the signal processing apparatus shown in FIG. 1B.

First, a configuration of a signal analyzing apparatus according to the present embodiment will be described in accordance with the signal processing procedures.

Figure 3:
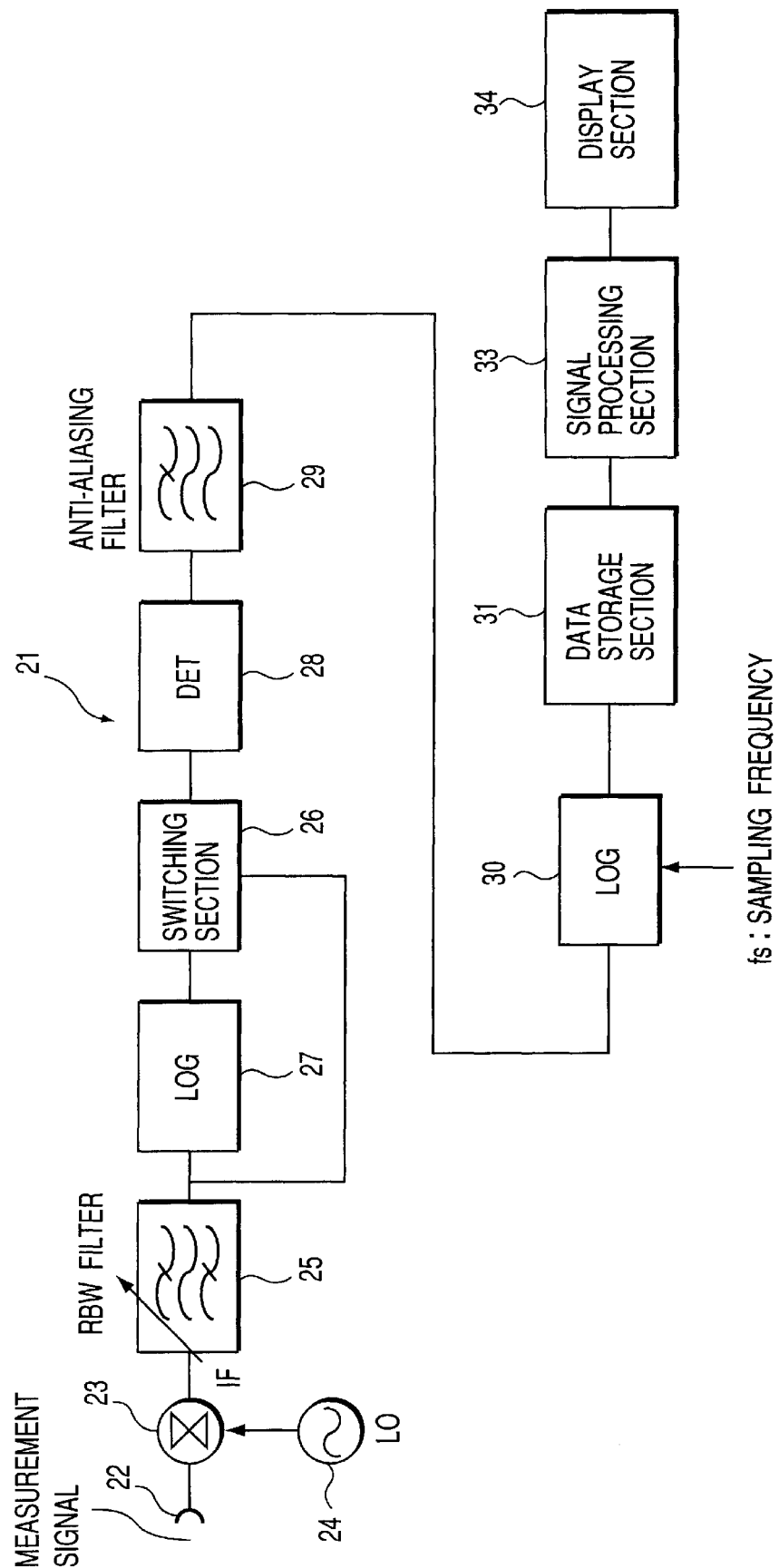
FIG. 3 is a block diagram depicting a general configuration of a generally known conventional signal analyzing apparatus.

An operation during frequency sweeping in the signal analyzing apparatus according to the present embodiment is executed in the same manner as that in the prior art described by referring to FIG. 3. A description of the above operation is omitted here.

The signal processing procedures described hereinafter is executed by time span sweeping for fixing a frequency of a first local oscillator, and measuring a time change of a signal bandwidth limited to a normalized bandwidth by means of a RBW filter.

That is, the signal level of a measured analog signal with its high frequency (for example, some hundreds KHz to some GHZ) inputted via an input terminal 2 is adjusted to a normalized level by means of an attenuator (ATT) (not shown).

Then, the measured signal with its level adjusted high frequency is mixed with the local oscillation signal from a local oscillator 4 by means of a signal mixer 3, whereby the mixed signal is converted as an intermediate frequency signal reduced to a predetermined intermediate frequency.

In this manner, the intermediate frequency signal with its reduced frequency is inputted to an RBW filter 5 at the next stage configured of an analog band pass filter.

Figures 2A, 2B:
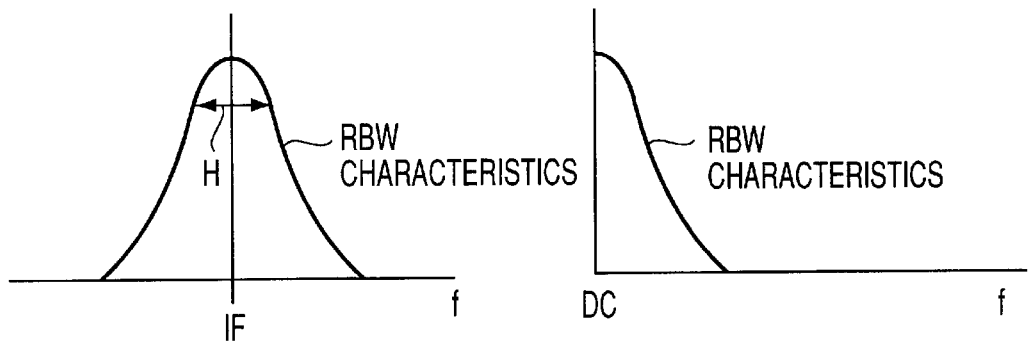
FIG. 2A to FIG. 2D are views showing a signal bandwidth at each of points "a" to "d"

This RBW filter 5 is such that its bandwidth (RBW: bandwidth H at a time when a peak level at the passing center frequency IF shown in FIG. 2A falls by 3 dB) can be variably set to 30 KHz, 10 KHz, 3 KHz, 1 KHz or 300 Hz, for example.

Then, this RBW filter 5 eliminates an unwanted frequency component of an intermediate frequency signal inputted from the signal mixer 3, thereby passing only the intermediate frequency signal of the frequency component in the bandwidth (RBW) variably set as described above.

In this manner, the signal passing through the RBW filter 5 is gain adjusted by means of an amplifier (not shown), and then, a contact point (not shown) of a switching section 6 is switched to the LOG converter (LOG) 7 side. In this state, the signal is logarithm converted by means of this LOG converter 7 to be compressed, and then, detected by a waveform detector (DET) 8.

In contrast, while the contact point (not shown) of the switching section 6 is switched to the RBW filter 5 side, the signal passing through the RBW filter 5 is detected intact by means of the waveform detector (DET) 8.

At the switching section 6, in the case where data is acquired over a wide dynamic range, a contact point (not shown) is switched to the LOG converter 7 side. In the case where linear data is acquired, a contact point (not shown) is switched to the RBW filter 5 side.

The thus detected signal by the waveform detector 8 is inputted to an anti-aliasing filter 9 at a next stage, as a base band signal having its bandwidth characteristics of the RBW filter 5, as shown in FIG. 2B.

Figure 2C:
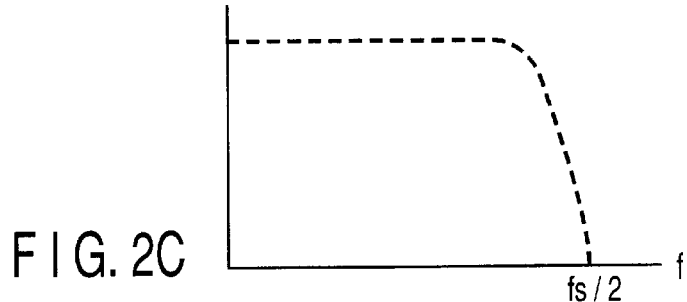

This anti-aliasing filter 9, as shown in FIG. 2C, has its passing bandwidth that encompasses frequency characteristics of the maximum bandwidth of the RBW filter 5 variably set as described above, and, for example, eliminates a noise component caused by a sampling frequency inputted to an A/D converter 10 at a next stage.

The signal from this anti-aliasing filter 9 is serially converted into digital data at a sampling frequency "fs" by means of the A/D converter 10 at a next stage.

The digital data from this A/D converter 10 is stored in a data storage section 11 at a next stage.

Then, re-sampling processing is applied to data stored in the data storage section 11 by means of a signal processing section 13 based on input information of a setting input section 12 described below.

Then, arbitrary time data is generated by re-sampling processing of the signal processing section 13, and the data is displayed on the display screen of a display section 14 according to a time domain in which time and amplitude are defined on horizontal and vertical axes, respectively.

The setting input section 12 consists of a man-machine interface for determining measurement conditions (data generation resolution, data acquisition timing and measurement start timing).

This setting input section 12 sets and inputs to the signal processing section 13 a variety of parameters such as data generation quantity, data generation resolution and data acquisition start time.

Among them, the data generation quantity is generally fixed on the display screen of the display section 14.

In addition, the data generation resolution is varied by a value such as time span.

Further, the data acquisition start time is determined by the apparatus or is determined by the user using a trigger function or the like.

These parameters are processed by means of the signal processing section 13 so as to be converted into an address of the data storage section 11 in which sampling data is stored.

Then, the signal processing section 13 is composed of, for example, a microprocessor unit (MPU), a digital signal processor (DSP), and a central processor unit (CPU) and the like.

As shown in FIG. 1B, this signal processing section 13 internally comprises a data acquisition management section 131, a processing condition converting section 132, a data generating section 133, and a display control section 134.

The data acquisition management section 131 guarantees acquisition of interpolation data before and after generation data used for interpolation when data between the existing data is interpolated as re-sampling processing, and associates a data acquisition timing from the data storage section 11 with an address of the data acquisition section 11.

In addition, a processing condition converting section 132 introduces a condition corresponding to a data acquisition resolution (time span) in which how many addresses of the data storage section 11 require one item of data.

Further, a data generating section 133 uses a re-sampling function (or interpolation function and decimation), and creates data between the existing sampling data stored in the data storage section 11 by re-sampling.

That is, the data generating section 133 performs convolution computation between filter data and sampling data caused by a re-sampling function, thereby generating interpolation data.

Linear interpolation, a spline function and a sampling function (sinx/x), for example, are employed to generate data re-sampled at the data generating section 133.

Actually, when data is generated by performing re-sampling at the data generating section 133, a sampling function with its small error and good signal reproduction may be preferably employed.

In addition, in the case where re-sampling is performed by employing a sampling function, a passing bandwidth can be restricted by employing a rectangular wave window, a Hanning window, a Hamming window, a Blackman window, a Kaiser window or a Blackman Harris window.

Figure 2D:
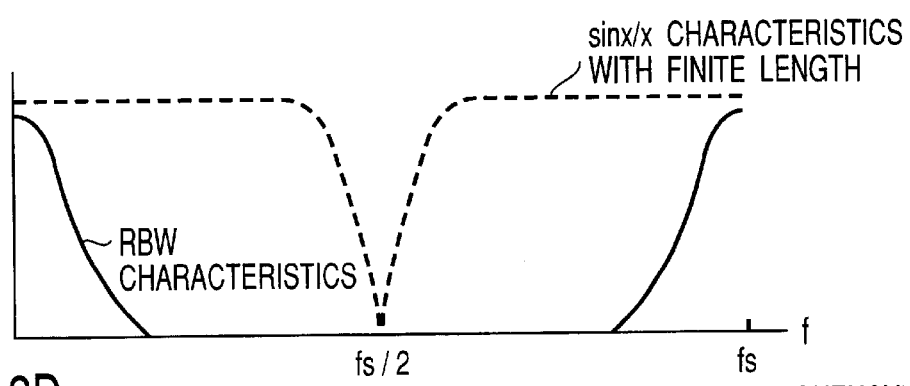

In an example shown in FIG. 2D, a characteristic sinx/x with a finite length using a window function is denoted by a broken line.

In the case where a rectangular wave window is used as a window function, a side robe is superimposed on a main robe (basic wave) as a ripple.

Therefore, in order to suppress the ripple, a window function such as a Hanning window, Hamming window, Blackman window, Kaiser window, or Blackman Harris window which have a small maximum value of attenuation quantity of the side robe as compared with a rectangular wave window may be preferably employed.

Further, at the display control section 134, since a value of data stored in the data storage section 11 is merely a read value of the A/D converter 10, a conversion to a significant value is simultaneously performed.

That is, the display control section 134 controls a display section 14 so that a level change of the measured signal signal-processed by a signal processing section 13 based on data stored in the data storage section 11 is displayed on the display screen of a display section 14 by defining time and amplitude on horizontal and vertical axes of the display section 14, for example.

Now, an outline of processing executed at a data acquisition management section 131, processing condition converting section 132, data generating section 133, and display control section 134 of the signal processing section 13, will be described with reference to a flow chart shown in FIG. 1C.

First, assume that the following measurement conditions are set and computed by the setting input section 12 (step S1).

Sampling rate: 10 MHz (100 ns resolution)
Data generation quantity: 501 (0 to 500 points)
Data generation resolution: Time span 0.125 msec
Resolution=250 milliseconds/data interval
Data acquisition start time: (from data) of 2025 nsec after data acquisition start time Based on the above measurement conditions, 501 items of data are generated by 2.5 items by re-sampling them from the 20.25-th address of the data storage section 11 using the data stored in the data storage section 11 (steps S2, S3, S4 and S5).

That is, the data acquisition management section 131 controls a data storage section 11, as described above (step S2).

Next, the data storage section 11 starts acquisition of the corresponding data (step S2), and terminates acquisition after the corresponding data has been acquired (step S3).

Then, the processing condition converting section 132 generates information required for processing at the data generating section 133, as described above (step S3).

Next, the data generating section 133 generates data by re-sampling processing (step S4).

Then, the display control section 134 generates display data (step S5), and displays the display data on the display section 14 (step S6).

The re-sampling used here denotes that a sampling rate of the A/D converter 10 and/or a data acquisition time are/is changed by combining interpolation or decimation with each other.

In principle, in this re-sampling, data is generated at a sufficiently high sampling rate by using an interpolation function, and data is generated at a desired sampling rate and timing by decimation.

As an example, a case in which data shifted by a ¼ clock of 4 MHz is obtained from data generated at a sampling rate of 10 MHz, will be described with reference to FIG. 1D.

In the case of considering interpolation, assuming that data is generated at the lowest common multiple of 10 MHz and 4 MHz, the data can be converted into data generated at 10 MHz to 4 MHz. Thus, one item of 20 MHz data may be acquired by 5 items.

In this case, however, a timing of data to be obtained is shifted by a ¼ clock, and thus, data corresponding to 40 MHz is generated in accordance with the procedures below.

First, as shown in FIG. 1D, three items of data (a1, a2, a3), (b1, b2, b3), (c1, c2, c3), (d1, d2, d3), (e1, e2, e3), (f1, f2, f3), (g1, g2, g3), (h1, h2, h3) are interpolated among data A0, A2, A3, A4, A5, A6, A7, A8 . . . by a ¼ internal, (x4 interpolation).

In this way, 40 MHz data A0, a1, a2, a3, A1, b1, b2, b3, A2, c1, c2, c3, A3, d1, d2, d3, A4, e1, e2, e3, A5, f1, 2, f3, A6, g1, g2, g3, A7, h1, h2, h3, A8 are generated.

Next, when data A0 is defined as a start point (0th), 4 MHZ data shifted by a ¼ clock is obtained. Thus, the next first data a1 of data A0 is defined as a new start point (¼ clock shift).

Then, a new data array (corresponding to 4 MHz) from which one item of data a1, c3, f1, h3, is removed per by 10 items is generated (⅕ decimation).

In this manner, re-sampling completes, and the 4 MHZ data shifted by a ¼ clock is generated from the data generated at a sampling rate of 10 MHz.

In the meantime, as described above, in both of interpolation and decimation, if a signal component is ignored, an error can occur.

In general, a low pass filter is used in order to apply limitation to a finally required frequency bandwidth.

Interpolation and decimation are defined as sampling actions, and the same filter characteristics may be used.

The same filter characteristics used here denotes that decimation is defined as simple decimation if a filter is applied during interpolation.

In operation under the above described measurement conditions, it is found that only 0.25-th (a1), 2.75-th (c3), 5.25-th (f1), 7.75-th (h3) data, of 4 MHz are required.

Namely, the other items of data (A0, a2, a3, A1, b1, b2, b3, A2, c1, c2, A3, d1, d2, d3, A4, e1, e2, e3, A5, f2, f3, A6, g1, g2, g3, A7, h1, h2, A8 . . . ) and the like are discarded even if they are generated.

Only required timing data is generated by using a re-sampling function (or interpolation function and decimation).

In the case arbitrary data is generated by a re-sampling function (or interpolation and decimation), new data is generated based on the preceding and succeeding data. Thus, redundant data is required before and after the above data.

In this manner, in a signal analyzing apparatus according to the present embodiment, there can be provided a signal analyzing apparatus (spectrum analyzer) in which a sampling rate of the A/D converter 10 is fixed according to the frequency characteristics (bandwidth) of the RBW filter 5 instead of time analysis and/or decomposition to be obtained, the apparatus being provided with a time span sweeping function.

In particular, data is generated by re-sampling using a sampling function (sinx/x) with its finite length so that characteristics up to the vicinity of a Nyquist frequency of fs/2 (sampling frequency: fs) can be reproduced.

In this manner, when the maximum bandwidth of the RBW filter 5 is determined, there is no need to change a sampling rate of the A/D converter 10. Thus, as in a conventional case, the time change of a measured signal can be recognized in detail without increasing the sampling rate of the A/D converter.

A sampling function sinx/x function will be described in more detail.

When the sampling function=fs, the sampling time T=1/fs, $x=t\times(\pi/T)$ is obtained, where "t" indicates a time of data to be acquired.

Therefore, the sampling data exists in a value of $t=n\times T$, $n=$ . . . , −1, 0, 1 . . . (integer).

Re-sampling denotes that data is generated when t=1.5, for example.

The sampling function (sinx/x) is efficient in that the sampling function is a LPF (low pass filter) of the Nyquist frequency (=sampling frequency/2) (basically using an infinite number of samples).

The use of the sampling function is equivalent to acquisition of data of desired time by applying an analog filter.

Further, in comparing one interpolation caused by the sampling function and the other interpolation, a signal is digitally produced from certain data irrespective of frequency characteristics (i.e., by ignoring analog signal based frequency characteristics).

Spline function interpolation is better than linear interpolation in quality, and however, such spline interpolation does not still consider frequency characteristics.

Namely, a sampling function is used for the purpose of reproduction considering frequency characteristics, and thus, precision is improved (reproduced more precisely considering signal characteristics).

In the meantime, the signal analyzing apparatus according to the present embodiment can be used to analyze an optical signal that is a measured signal.

In this case, an optical signal that is a measured signal to be inputted is converted into an electrical signal, and then, processing similar to the above described embodiment is performed.

In addition, although the signal analyzing apparatus 1 shown in FIG. 1 is configured so that an anti-aliasing filter 9 is provided at the next stage of the waveform detector 8, a configuration from which this anti-aliasing filter is omitted may be provided.

In this case, the frequency characteristics of the RBW filter 5 is set to be equal to or less than the Nyquist frequency of the A/D converter 10. Specifically, the frequency that is twice or three times of the bandwidth (RBW) of the RBW filter 5 is set to be equal to or smaller than the Nyquist frequency of the A/D converter 10.

As is evident from the foregoing description, according to the present invention, unlike the conventional case, there can be provided a signal analyzing apparatus (spectrum analyzer) provided with a time span sweeping function, wherein a sampling rate of an A/D converter is fixed according to the frequency characteristics (bandwidth) of a RBW filter without increasing the sampling rate of the A/D converter, and the time change of the measured signal can be recognized in detail.

In particular, when data is generated by re-sampling using a sampling function (sinx/x) with its finite length, characteristics up to the vicinity of a Nyquist frequency can be reproduced.

In this manner, when the maximum bandwidth of the RBW filter is determined, there is no need to change the sampling rate of the A/D converter. Thus, unlike the conventional case, the time change of the measured signal can be recognized even without increasing the sampling rate of the A/D converter.

In addition, the sampling rate can be set to a low speed, the number of A/D conversion bits can be allocated. Thus, the dynamic range characteristics can be maintained without degrading the dynamic range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal analyzing apparatus comprising:
   a local oscillator for oscillating a local oscillation signal;
   a signal mixer for mixing a measured signal with the local oscillation signal from the local oscillator to exact time span sweeping for fixing a frequency of the local oscillation signal;
   a resolution bandwidth RBW filter in which a bandwidth is set so as to selectively pass a frequency component of only a desired signal bandwidth of the measured signal that has been frequency-converted into a normalized intermediate frequency signal;
   a waveform detector for detecting a signal passing through the RBW filter;

an analog/digital A/D converter for sampling the signal detected by the waveform detector at a predetermined sampling rate at which a Nyquist frequency is within the frequency bandwidth of the RBW filter, thereby converting the sampled signal into digital data;

a data storage section for storing digital data of a time domain converted by the A/D converter;

a signal processing section for re-sampling the digital data of the time domain stored in the data storage section so as to enable reproduction of a bandwidth of the signal detected by the waveform detector, thereby generating arbitrary time data to measure a time change of the bandwidth of the measured signal limited to the normalized bandwidth by the RBW filter; and a display section for displaying the arbitrary time data generated by the signal processing section while time and amplitude are defined on horizontal and vertical axes on a display screen.

2. A signal analyzing apparatus according to claim 1, wherein the signal processing section performs the re-sampling by using at least one of line interpolation, spline function interpolation and sampling function interpolation.

3. A signal analyzing apparatus according to claim 2, wherein the signal processing section performs the re-sampling by using the sampling function interpolation, and a passing bandwidth of the sampling function interpolation is limited by a window function.

4. A signal analyzing apparatus according to claim 1, wherein an anti-aliasing filter set in a passing bandwidth encompassing a maximum bandwidth of the RBW filter is provided between the RBW filter and the A/D converter.

5. A signal analyzing apparatus according to claim 1, wherein the signal processing section comprises:

data acquisition management means for, in interpolating data between existing data, guaranteeing acquisition of interpolation data before and after generation data used for interpolation, and then, associating a data acquisition timing from the data storage section with an address of the data storage section;

processing condition converting means for determining a condition corresponding to a data generation resolution time span indicating a number of addresses in the data storage section that are required for one item of data, and determining a condition corresponding to a data acquisition timing indicating a number of data generated in the data storage section or indicating the number of addresses from which the data in the data storage section must be used;

data generating means for using a re-sampling function or interpolation function and decimation, thereby generating data between existing sampling data stored in the data storage section by means of re-sampling; and display control means for controlling the display section to display a level variation of the measured signal based on data generated by the data generating means based on the data stored in the data storage section while time and amplitude are defined on horizontal and vertical axes, respectively, on the display screen of the display section.

6. A signal analyzing apparatus comprising:

a resolution bandwidth RBW filter in which a bandwidth is set so as to selectively pass a frequency component of only a desired signal bandwidth of a measured signal that has been frequency-converted into a normalized intermediate frequency signal;

a waveform detector for detecting a signal passing through the RBW filter;

an analog/digital A/D converter for sampling the signal detected by the waveform detector at a predetermined sampling rate at which a Nyquist frequency is within the frequency bandwidth of the RBW filter, thereby converting the sampled signal into digital data;

a data storage section for storing digital data of a time domain converted by the A/D converter;

a signal processing section for re-sampling the digital data of the time domain stored in the data storage section so as to enable reproduction of a bandwidth of the signal detected by the waveform detector, thereby generating arbitrary time data to measure a time change of the bandwidth of the measured signal limited to the normalized bandwidth by the RBW filter; and a display section for displaying the arbitrary time data generated by the signal processing section while time and amplitude are defined on horizontal and vertical axes on a display screen;

wherein the signal processing section comprises:

data acquisition management means for, in interpolating data between existing data, guaranteeing acquisition of interpolation data before and after generation data used for interpolation, and then, associating a data acquisition timing from the data storage section with an address of the data storage section;

processing condition converting means for determining a condition corresponding to a data generation resolution time span indicating a number of addresses in the data storage section that are required for one item of data, and determining a condition corresponding to a data acquisition timing indicating a number of data generated in the data storage section or indicating the number of addresses from which the data in the data storage section must be used;

data generating means for using a re-sampling function or interpolation function and decimation, thereby generating data between existing sampling data stored in the data storage section by means of re-sampling; and display control means for controlling the display section to display a level variation of the measured signal based on data generated by the data generating means based on the data stored in the data storage section while time and amplitude are defined on horizontal and vertical axes, respectively, on the display screen of the display section.

7. signal analyzing apparatus according to claim 6, wherein the signal processing section performs the re-sampling by using at least one of line interpolation, spline function interpolation and sampling function interpolation.

8. A signal analyzing apparatus according to claim 7, wherein the signal processing section performs the re-sampling by using the sampling function interpolation, and a passing bandwidth of the sampling function interpolation is limited by a window function.

9. A signal analyzing apparatus according to claim 6, wherein an anti-aliasing filter set in a passing bandwidth encompassing a maximum bandwidth of the RBW filter is provided between the RBW filter and the A/D converter.

* * * * *